US009170088B2

(12) United States Patent
Lim et al.

(10) Patent No.: US 9,170,088 B2
(45) Date of Patent: Oct. 27, 2015

(54) APPARATUS AND METHOD FOR OPTICAL COHERENCE TOMOGRAPHY USING MULTIPLE BEAMS

(75) Inventors: Jae-guyn Lim, Seongnam-si (KR); Min-seog Choi, Seoul (KR); Won-hee Choi, Seoul (KR); Seong-deok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 13/296,960

(22) Filed: Nov. 15, 2011

(65) Prior Publication Data

US 2012/0262722 A1 Oct. 18, 2012

(30) Foreign Application Priority Data

Apr. 12, 2011 (KR) .................. 10-2011-0033773

(51) Int. Cl.
*G01B 9/02* (2006.01)
(52) U.S. Cl.
CPC ........ *G01B 9/02027* (2013.01); *G01B 9/02007* (2013.01); *G01B 9/02028* (2013.01); *G01B 9/02091* (2013.01)
(58) Field of Classification Search
USPC .................................................. 356/479, 497
See application file for complete search history.

(56) References Cited

U.S. PATENT DOCUMENTS

| 7,319,529 | B2 * | 1/2008 | Babayoff ................. 356/601 |
| 7,830,524 | B2 * | 11/2010 | Teramura et al. ............. 356/477 |
| 2008/0100848 | A1 * | 5/2008 | Kobayashi ................. 356/497 |
| 2008/0192236 | A1 | 8/2008 | Smith et al. |
| 2008/0304078 | A1 * | 12/2008 | Freishlad et al. ............. 356/497 |
| 2009/0180123 | A1 * | 7/2009 | Knighton et al. ............. 356/479 |
| 2010/0053636 | A1 | 3/2010 | Holmes et al. |

FOREIGN PATENT DOCUMENTS

| JP | 2005-156540 | 6/2005 |
| JP | 2006-047264 | 2/2006 |
| JP | 2009-025202 | 2/2009 |
| KR | 10-2004-0081964 A | 9/2004 |

OTHER PUBLICATIONS

Homepage: Vivosight Oct Scanner(Multi-Beam Oct). <i>http://www.md-ltd.co.uk/</i>. Michelson Diagnostics, 2015. Accessed: Jan. 16, 2015. (1 page, in English).

* cited by examiner

*Primary Examiner* — Tarifur Chowdhury
*Assistant Examiner* — Jonathon Cook
(74) *Attorney, Agent, or Firm* — NSIP Law

(57) ABSTRACT

An apparatus and method for optical coherence tomography are provided. The apparatus includes a light source configured to generate a plurality of beams, a light coupler configured to split the plurality of beams into measurement beams and reference beams, transmit the measurement beams to a target object via a probe, and receive response beams from the probe, a detector configured to detect interference signals based on interference between the response beams and the reference beams, and an image processor configured to generate a first image of the target object based on any one of the interference signals and generate a second image of the target object having image characteristics different from those of the first image based on an other one of the interference signals.

22 Claims, 6 Drawing Sheets

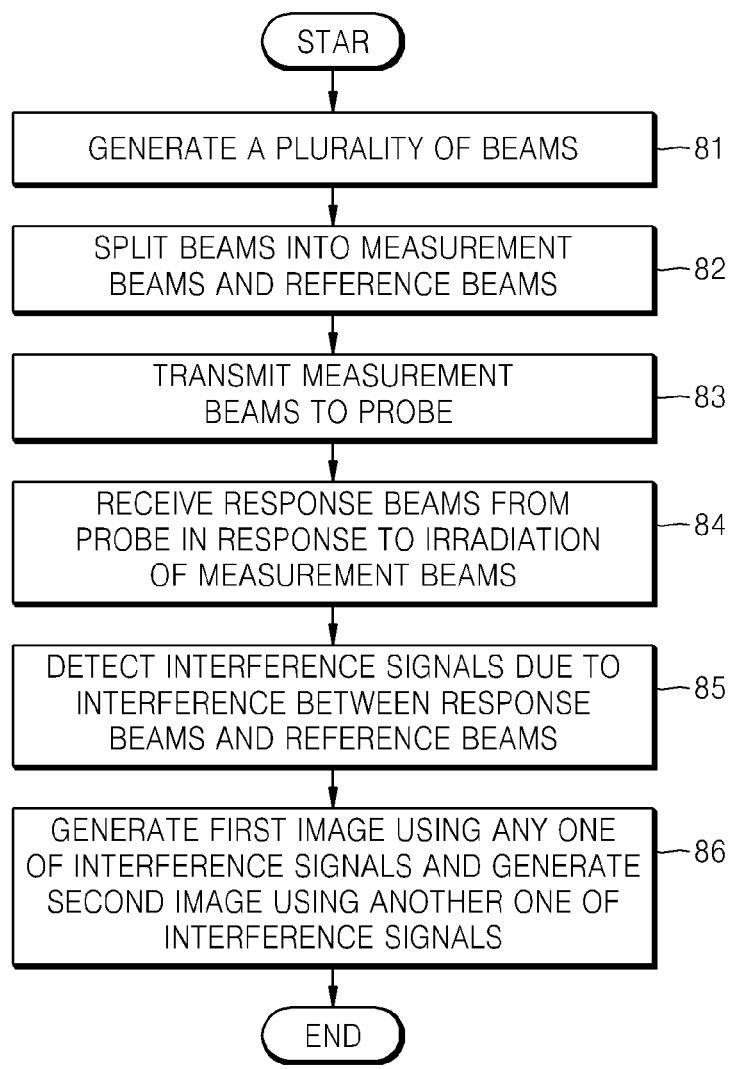

APPARATUS AND METHOD FOR OPTICAL COHERENCE TOMOGRAPHY USING MULTIPLE BEAMS

CROSS-REFERENCE TO RELATED APPLICATIONS

This application claims the benefit of Korean Patent Application No. 10-2011-0033773, filed on Apr. 12, 2011, in the Korean Intellectual Property Office, the entire disclosure of which is incorporated herein by reference for all purposes.

BACKGROUND

1. Field

The following description relates to an apparatus and method for optical coherence tomography using a plurality of beams, and more particularly, to an apparatus and method for generating a tomography image of a target object using a plurality of beams.

2. Description of the Related Art

Various apparatuses for capturing internal transmission images and tomographic images, such as X-ray systems, computerized tomography (CT) scanners, magnetic resonance image (MRI) systems, and ultrasound systems, have been studied and are currently being used in various fields. The above-described apparatuses allow for understanding of causes, locations, and progressions of various diseases without having to directly cut into the internal structures of human bodies and organisms. In other words, the above described apparatuses enable non-invasive diagnostics. Such diagnostics provide for accurate diagnosis of various medical conditions. The above-described apparatuses thus have a significant role in medical fields. In the above-described diagnosis apparatuses, low harmfulness to living bodies, acquisition of high-resolution images, reasonable price, and convenience in handling are regarded as significant factors.

An optical coherence tomography apparatus may be capable of capturing internal images of living tissues and materials in real-time using beams without inflicting damage on inner parts of the living tissues and materials.

SUMMARY

In one general aspect, there is an apparatus for optical coherence tomography provided. The apparatus includes a light source configured to generate a plurality of beams, a light coupler configured to split the plurality of beams into measurement beams and reference beams, transmit the measurement beams to a target object via a probe, and receive response beams from the probe, a detector configured to detect interference signals based on interference between the response beams and the reference beams, and an image processor configured to generate a first image of the target object based on any one of the interference signals and generate a second image of the target object having image characteristics different from those of the first image based on an other one of the interference signals.

The apparatus for optical coherence tomography may further include that the plurality of beams includes beams having different central wavelengths, one of the response beams and one of the reference beams are beams having a first central wavelength, and an other one of the response beams and an other one of the reference beams are beams having a second central wavelength.

The apparatus for optical coherence tomography may further include that the interference signal associated with the first image is detected based on interference between any one of the response beams and a corresponding one of the reference beams, and the interference signal associated with the second image is detected based on interference between an other one of the response beams and a corresponding one of the reference beams.

The apparatus for optical coherence tomography may further include that the probe sequentially transmits the measurement beams to the target object, and the probe sequentially receives the response beams from the target object.

The apparatus for optical coherence tomography may further include that the probe simultaneously transmits the measurement beams to the target object, and the probe simultaneously receives the response beams a from the target object.

The apparatus for optical coherence tomography may further include that a first selected response beam is extracted from the response beams, and a second selected response beam is extracted from the response beams.

The apparatus for optical coherence tomography may further include that the measurement beams are transmitted to the target object to a single focal depth.

The apparatus for optical coherence tomography may further include that a first measurement beam, which is selected from the measurement beams, is transmitted to the target object to a first focal depth, and a second measurement beam, which is selected from the measurement beams, is transmitted to the target object to a second focal depth.

The apparatus for optical coherence tomography may further include an image generator configured to generate a first image and a second image, and an output image generator configured to generate an output image using the first and second images based on a first weight of the first image and a second weight of the second image.

The apparatus for optical coherence tomography may further include an image generator configured to generate a first image and a second image, and an output image generator configured to extract a high-frequency region of the first image from the first image based on a central wavelength of a measurement beam corresponding to the first image from among the measurement beams, extract a high-frequency region of the second image from the second image based on a central wavelength of a measurement beam corresponding to the second image from among the measurement beams, and generate an output image from the first and second images based on the extracted high-frequency region of the first image and the extracted high-frequency region of the second image.

The apparatus for optical coherence tomography may further include that the optical coupler transmits the reference beams to a reflector via a reference probe and receives reflection beams from the reference probe, and the detector detects inference signals based on interference between the response beams and the reflection beams.

In another aspect, a method for optical coherence tomography is provided. The method includes generating a plurality of beams, splitting the plurality of beams into measurement beams and reference beams, transmitting the measurement beams to a target object via a probe, receiving response beams transmitted to the probe from the probe in response to the measurement beams, detecting interference signals based on interference between the response beams and the reference beams, generating a first image of the target object based on any one of the interference signals, and generating a second image of the target object having image characteristics different from those of the first image based on an other one of the interference signals.

The method for optical coherence tomography may further include that the plurality of beams includes beams having different central wavelengths, one of the response beams and one of the reference beams are beams having a first central wavelength, and an other one of the response beams and an other one of the reference beams are beams having a second central wavelength.

The method for optical coherence tomography may further include that the interference signal associated with the first image is detected based on interference between any one of the response beams and a corresponding one of the reference beams, and the interference signal associated with the second image is detected based on interference between an other one of the response beams and a corresponding one of the reference beams.

The method for optical coherence tomography may further include that the measurement beams are sequentially transmitted to the target object by the probe, and the response beams are sequentially received from the target object by the probe.

The method for optical coherence tomography may further include that the measurement beams are simultaneously transmitted to the target object by the probe, and the response beams are simultaneously received from the target object by the probe.

The method for optical coherence tomography may further include that any one of the response beams is extracted from the response beams, and an other one of the response beams is extracted from the response beams.

The method for optical coherence tomography may further include that the measurement beams are transmitted to the target object to a single focal depth.

The method for optical coherence tomography may further include that any one of the measurement beams is transmitted to the target object to a first focal depth, and an other one of the measurement beams is transmitted to the target object to a second focal depth.

The method for optical coherence tomography may further include generating an output image from the first and second images based on a first weight of the first image and a second weight of the second image.

The method for optical coherence tomography may further include transmitting the reference beams to a reflector via a reference probe, and receiving reflection beams from the reference probe. The detecting of the inference signals includes detecting the interference signals based on interference between the response beams and the reflection beams.

In another aspect, a non-transitory computer-readable medium is provided having embodied thereon a computer program that if executed causes a processor to execute a method for optical coherence tomography. The method includes receiving interference signals detected based on interference between response beams received from a target object by a probe and reference beams, generating a first image based on any one of the interference signals, and generating a second image having image characteristics different from those of the first image based on an other one of the interference signals.

Other features and aspects may be apparent from the following detailed description, the drawings, and the claims.

BRIEF DESCRIPTION OF THE DRAWINGS

FIG. 8 is a flowchart illustrating an example of a method for optical coherence tomography.

Figure 1:
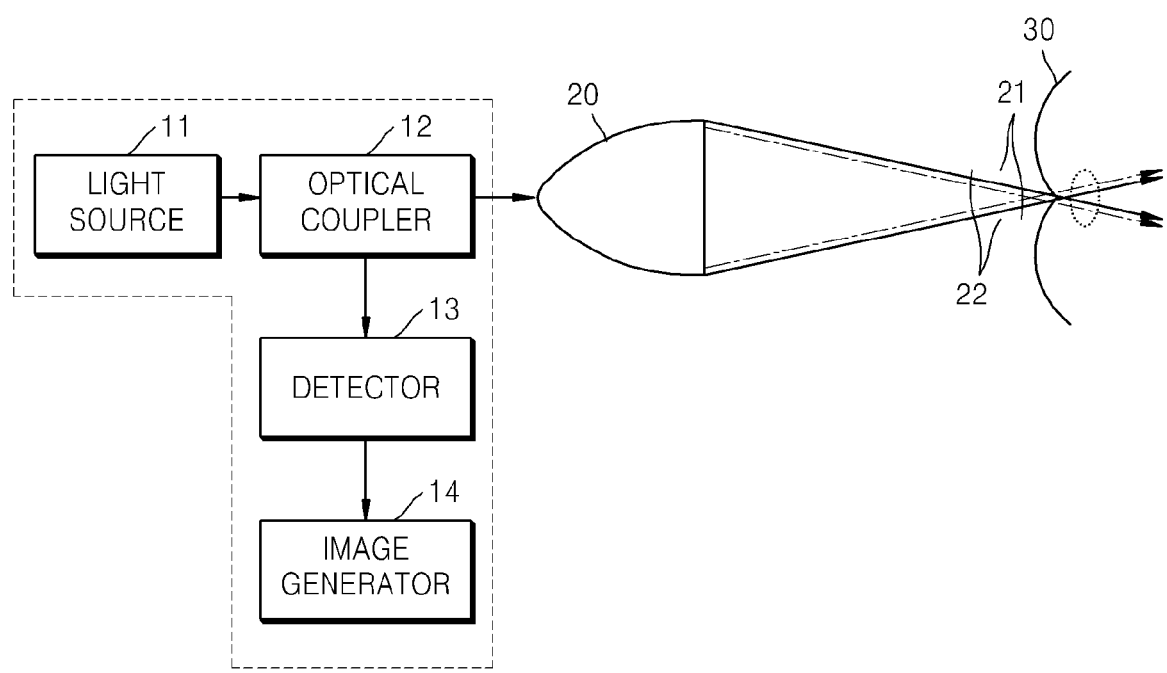
FIG. 1 is a diagram illustrating an example of an apparatus for optical coherence tomography.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. For example, in addition to components configured to generate image signals of examinees, components may be configured to display the image signals of the examinees on a screen or a sheet of paper to enable a medical expert, such as a doctor, to interpret the image signals.

FIG. 1 is a diagram illustrates an example of an apparatus for optical coherence tomography.

Referring to FIG. 1, an apparatus 10 for optical coherence tomography transmits measurement beams to a probe 20. For example, the apparatus 10 splits a plurality of beams into measurement beams and reference beams and transmits the measurement beams to the probe 20. The probe 20 may emit the measurement beams to a target object 30 and receive response beams from the target object 30 in response to the transmission of the measurement beams. For example, the probe 20 may emit a measurement beam 21 of the measurement beams to the target object 30 and receive a corresponding one of the response beams from the target object 30. The probe 20 may also emit a measurement beam 22 of the measurement beams to the target object 30 and receive a corresponding one of the response beams from the target object 30. As an example, the measurement beams may be sequentially or simultaneously emitted to the target object 30.

The probe 20 may transmit the received response beams to the optical coherence tomography apparatus 10. For example, the probe 20 may transmit to the optical coherence tomography apparatus 10 any one of the response beams received from the target object 30. The probe 20 may also transmit to the optical coherence tomography apparatus 10 another one of the response beams received from the target object 30. The probe 20 may also transmit to the optical coherence tomography apparatus 10 a plurality of the response beams received from the target object 30.

The optical coherence tomography apparatus 10 detects interference signals based on interference between the received response beams and the reference beams. For example, the optical coherence tomography apparatus 10 may detect an interference signal generated based on interference between any one of the received response beams and a corresponding one of the reference beams. For example, the optical coherence tomography apparatus 10 may split any one of the beams transmitted to it by the probe 20 into a first measurement beam and a first reference beam and detect a first interference signal based on interference between a first response beam received from the probe 20 and the first reference beam. As an example, the optical coherence tomography apparatus 10 may split another one of the beams transmitted to it by the probe 20 into a second measurement beam and a second reference beam and detect a second interference signal based on interference between a second response beam received from the probe 20 and a second reference beam.

The plurality of beams may be beams having different central wavelengths. For example, one of the beams may have a central wavelength of approximately 300 nm, another one of the beams may have a central wavelength of approximately 500 nm, and yet another beam of the beams may have a central wavelength of approximately 800 nm. As an example, measurement beams may be measurement beams having different central wavelengths, the reference beams may be reference beams having different central wavelengths, and the response beams may be response beams having different central wavelengths. Also, a measurement beam and a reference beam split from a single beam and a response beam corresponding to the measurement beam may be beams having the same wavelength. For example, the first measurement beam and the first reference beam split from a single beam and the first response beam may be beams having a first central wavelength. A central wavelength may refer to a wavelength having a maximum value in a relative distribution of wavelengths of beams. In addition, the central wavelength may be determined by, for example, calculating an average wavelength of the beams using the relative distribution of the wavelengths of the beams as a probability density function or obtaining an arithmetic mean of positions of a pair of wavelengths having half of the value of the wavelength having the maximum value in the relative distribution.

As an example, measurement beams may be emitted to the target object 30 to different focal depths. For example, any one of the measurement beams may be emitted to the target object 30 to a first focal depth by the probe 20, while another one of the measurement beams may be emitted to the target object 30 to a second focal depth by the probe 20.

The optical coherence tomography apparatus 10 generates an image of the target object 30 using an interference signal. The image may be referred to as a tomography image. Also, the optical coherence tomography apparatus 10 may generate a plurality of images using a plurality of inference signals. For example, the optical coherence tomography apparatus 10 may detect the first interference signal based on interference between the first response beam and the first reference beam and generate a first image using the detected first interference signal. The optical coherence tomography apparatus 10 may also detect the second interference signal based on interference between the second response beam and the second reference beam and generate a second image using the detected second interference signal. The optical coherence tomography apparatus 10 may also output the first image and the second image through an output unit.

The optical coherence tomography apparatus 10 may synthesize a plurality of fundamental images and generate an output image. For example, the optical coherence tomography apparatus 10 may generate a first fundamental image using the first interference signal detected based on interference between the first reference beam and the first response beam, generate a second fundamental image using the second interference signal detected based on interference between the second reference beam and the second response beam, and synthesize the first and second fundamental images to generate an output image. As an example, the optical coherence tomography apparatus 10 may apply a first weight to the first fundamental image, apply a second weight to the second fundamental image, and generate an output image from the first and second fundamental images according to the first weight and second weight. Accordingly, the first weight may be, for example, determined based on a central wavelength of at least one of the first measurement beam and the first reference beam split from a single beam, and the second weight may be determined based on a central wavelength of at least one of the second measurement beam and the second reference beam split from a single beam.

Operations of the optical coherence tomography apparatus 10 and the probe 20 will now be described in detail.

Referring to the example illustrated in FIG. 1, the optical coherence tomography apparatus 10 includes a light source 11, an optical coupler 12, a detector 13, and an image processor 14.

As an example, the light source 11 generates a plurality of beams. For example, the plurality of beams may be beams having different central wavelengths. For example, the beams may include a first beam having a central wavelength of approximately 300 nm, a second beam having a central wavelength of approximately 500 nm, a third beam having a central wavelength of about 800 nm, and a fourth beam having a central wavelength of approximately 1300 nm. Also, the central wavelengths of the beams may be within a wavelength range that allows for transmission of the beams through living tissue.

The plurality of beams may have different coherent lengths. For example, first and second beams of a plurality of beams may have different coherent lengths. For example, a coherent length of a beam may be determined using a central wavelength of the beam and a bandwidth of the beam as shown in Equation 1. $L_c$ refers to a coherent length of a beam, $\lambda$ refers to a central wavelength of the beam, and $\Delta\lambda$ refers to a bandwidth of the beam measured in wavelength units. However, Equation 1 is provided as only an example to derive the coherent length $L_c$ of the beam and may be modified in various examples. For example, assuming that a coherence time is defined as a power-equivalent width, a constant of Equation 1 may be changed from 0.44 to 0.66. Also, the coherent length $L_c$ of the beam may affect an axial resolution of an image generated by the optical coherence tomography apparatus 10, relative to a depthwise direction. For example, if the optical coherence tomography apparatus 10 generates a tomographic image of the target object 30 using beams with a coherent length of about 30 μm, the optical coherence tomography apparatus 10 may generate a tomographic image on which internal tissue, having width of about 30 μm or more of the target object 30, may be discriminated from other tissues.

$$L_C = 0.44 \frac{\lambda^2}{\Delta\lambda}. \tag{1}$$

Representative examples of beams may include a superluminescent-diode (SLD) beam and an edge-emitting light-emitting diode (ELED) beam. For example, various kinds of beams may be used in addition to the SLD and ELED beams. A beam type that is to be used may be determined in consideration of various factors, such as a central wavelength, a bandwidth, a coherent length, and an intensity of a beam and characteristics of a target object to be measured.

The light source 11 may transmit generated beams to the optical coupler 12. For example, the beams may be transmitted to the optical coupler 12 through free space. Alternatively, the beams may be transmitted to the optical coupler 12 through a transmission medium. An example of the transmission medium may include optical fibers. As an example, optical source 11 may sequentially transmit beams to the optical coupler 12. For example, the light source 11 may transmit a first beam of the beams to the optical coupler 12 and thereafter transmit a second beam of the beams to the optical coupler 12. The light source 11 may simultaneously transmit the beams to the optical coupler 12. For example, the light source 11 may simultaneously transmit the beams through optical fibers to the optical coupler 12 by wavelength division multiplexing. As an example, the beams may be combined into one signal based on central wavelengths of the beams by wavelength division multiplexing and transmitted through the optical fibers, and the transmitted beams may be split from one another by terminals of the optical fibers by wavelength division demultiplexing. For example, the transmitted beams may be split from one another by the optical coupler 12. As an example, the light source 11 may simultaneously transmit the beams to the optical coupler 12 through free space.

The optical coupler 12 splits beams into measurement beams and reference beams. As an example, the optical coupler 12 may provide at least two paths to split the beams into the measurement beams and the reference beams, transmit the measurement beams via any one of the paths, and transmit the reference beams to the other one of the paths. For example, the two paths may be paths through free space and the optical coupler 12 may allow a beam incident on a beam splitter to separately travel through the two paths in order to split the beams into the measurement beams and the reference beams. As an example, the optical coupler 12 may prepare at least two paths through a transmission medium to split the beams into the measurement beams and the reference beams, transmit the measurement beams through any one of the paths, and transmit the reference beams through the other one of the paths. An example of the transmission medium may include optical fibers. Furthermore, the optical coupler 12 may be configured in various shapes to split beams into measurement beams and reference beams.

The optical coupler 12 may sequentially split beams into measurement beams and reference beams. For example, the optical coupler 12 may split a first beam of the beams into a first measurement beam and a first reference beam and thereafter split a second beam of the beams into a second measurement beam and a second reference beam. The optical coupler 12 may simultaneously split the beams. For example, the optical coupler 12 may split the first beam into the first measurement beam and the first reference beam and simultaneously split the second beam into the second measurement beam and the second reference beam.

A measurement beam and a reference beam split from a single beam may have the same central wavelength as the single beam. For example, a first beam having a central wavelength of approximately 300 nm may be split into a first measurement beam having a central wavelength of approximately 300 nm and a first reference beam having a central wavelength of approximately 300 nm, and a second beam having a central wavelength of approximately 500 nm may be split into a second measurement beam having a central wavelength of approximately 500 nm and a second reference beam having a central wavelength of approximately 500 nm.

The optical coupler 12 may split beams into measurement beams and reference beams according to a division ratio. As an example, the division ratio refers to a ratio of an output intensity of the measurement beams to an output intensity of the reference beams. For example, the optical coupler 12 may split the beams into the measurement beams and the reference beams according to a ratio of 5:5. As another example, the optical coupler 12 may split the beams into the measurement beams and the reference beams according to a ratio of 9:1. Also, the optical coupler 12 may split any one of the beams into a first reference beam and a first measurement beam according to a first division ratio and split another one of the beams into a second reference beam and a second measurement beam according to a second division ratio. For example, the optical coupler 12 may split any one of the beams into the first reference beam and the first measurement beam according to a ratio of 5:5 and split another one of the beams into the second reference beam and the second measurement beam according to a ratio of 4:6. Furthermore, a division ratio may be determined in consideration for detecting interference signals.

The optical coupler 12 may transmit measurement beams to the probe 20. As described above, the measurement beams may have different central wavelengths. Also, the optical coupler 12 may transmit the measurement beams through any one of at least two paths. As stated above, the at least two paths may be paths through free space and may be formed by a beam splitter. However, the at least two paths may be formed by different optical fibers. Furthermore, the optical coupler 12 may transmit the measurement beams to the probe 20 using any one of at least two paths prepared using units with various shapes.

The optical coupler 12 may sequentially transmit the measurement beams to the probe 20. For example, the optical coupler 12 may transmit a first measurement beam of the measurement beams to the probe 20 and thereafter transmit a second measurement beam of the measurement beams to the probe 20. In another aspect, the optical coupler 12 may simultaneously transmit the measurement beams to the probe 20. For example, the optical coupler 12 may simultaneously transmit the measurement beams through optical fibers to the probe 20 by wavelength division multiplexing. The measurement beams may be combined into one signal based on central wavelengths of the measurement beams by the wavelength division multiplexing, and the transmitted measurement beams may be split by terminals of the optical fibers by wavelength division demultiplexing. The transmitted measurement beams may be split by the optical coupler 12. As an example, the optical coupler 12 may simultaneously transmit the measurement beams to the probe 20 through free space.

The measurement beams may be irradiated by the probe 20 to the target object 30. Also, response beams from the target object 30 may be received by the probe 20 in response to the emission of the measurement beams. In other words, the probe 20 may emit the measurement beams to the target object 30 and receive the response beams from the target object 30 in response to the emission of the measurement beams. For example, the response beams may be formed from the measurement beams after the measurement beams have been reflected or scattered.

The probe 20 may sequentially emit the measurement beams to the target object 30 and receive the response beams from the target object 30. The response beams may be sequentially or simultaneously received. For example, the probe 20 may emit the first measurement beam of the measurement beams to the target object 30, emit the second measurement beam of the measurement beams to the target object 30, and sequentially or simultaneously receive corresponding response beams from the target object 30.

Figure 2:
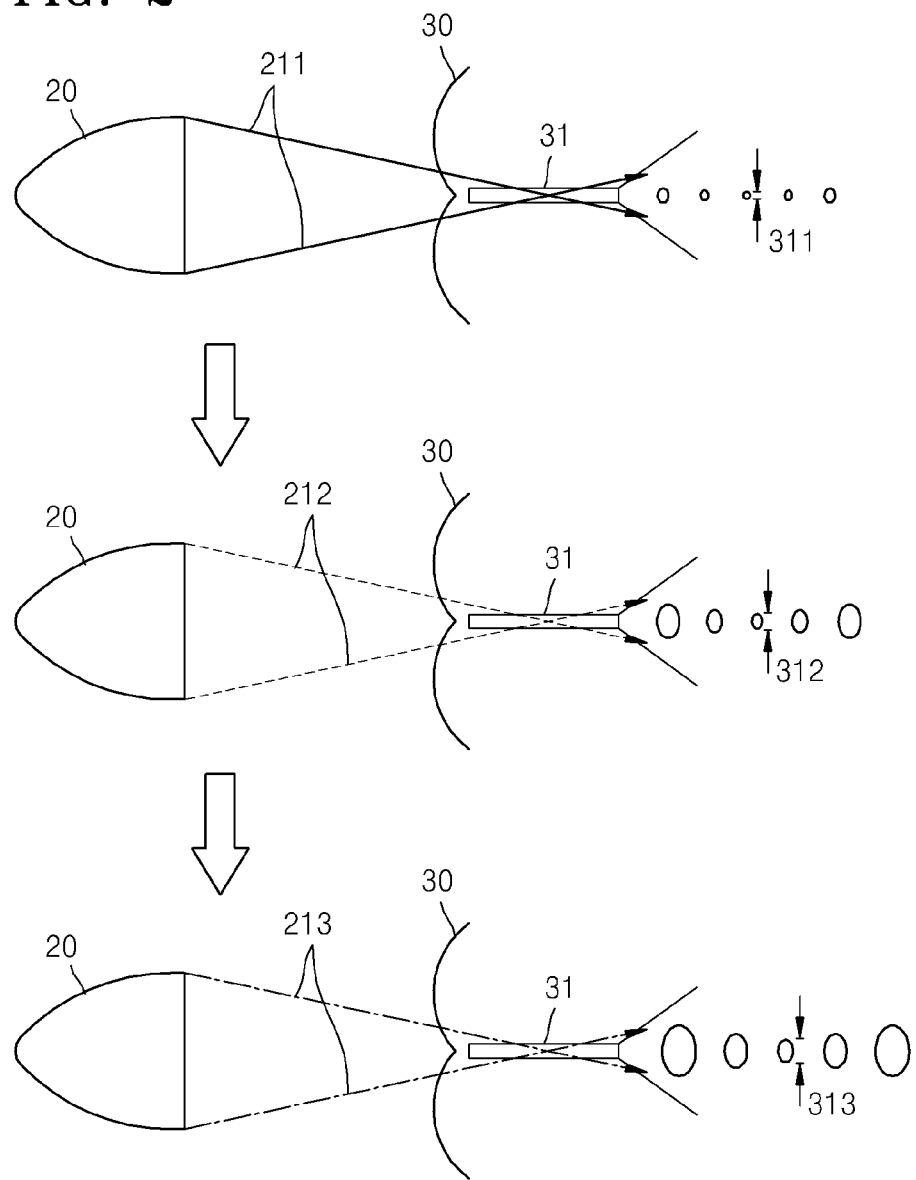
FIG. 2 is a diagram illustrating an example of measurement beams emitted by a probe.

FIG. 2 is a diagram illustrating an example of measurement beams 211, 212, and 213 emitted by the probe 20. Referring to FIG. 2, the probe 20 may sequentially emit the measurement beams 211, 212, and 213 to the target object 30. For example, the probe 20 may emit the measurement beam 211, as a first measurement beam, to the target object 30, emit the measurement beam 212, as a second measurement beam, to the target object 30, and emit the measurement beam 213, as a third measurement beam, to the target object 30. As an example, the probe 20 may emit the first through third measurement beams 211, 212, and 213 to the target object 30 to the same focal depth. As another example, the probe 20 may emit the first through third measurement beams 211, 212, and 213 to the target object 30 to different focal depths. For example, the probe 20 may emit the first measurement beam 211 to the target object 30 to a first focal depth, emit the second measurement beam 212 to the target object 30 to a second focal depth, and emit the third measurement beam 213 to the target object 30 to a third focal depth.

The probe 20 may simultaneously emit measurement beams to the target object 30 and receive response beams from the target object 30. The response beams may be sequentially or simultaneously received. For example, the probe 20 may simultaneously emit first and second measurement beams of the measurement beams to the target object 30 and sequentially or simultaneously receive corresponding response beams from the target object 30.

Figure 3:
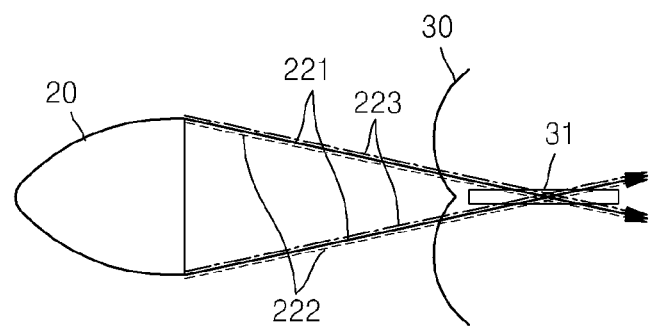
FIG. 3 is a diagram illustrating an example of measurement beams emitted by a probe.

FIG. 3 is a diagram illustrating an example of measurement beams 221, 222, and 223 emitted by the probe 20.

Referring to FIG. 3, the probe 20 may simultaneously emit the measurement beams 221, 222, and 223 to the target object 30. For example, the probe 20 may simultaneously emit the measurement beams 221, 222, and 223 to the target object 30. As an example, the probe 20 may emit the measurement beams 221, 222, and 223 to the target object 30 to the same focal depth. In another aspect, the probe 20 may emit the measurement beams 221, 222, and 223 to the target object 30 to different focal depths. For example, the probe 20 may emit the measurement beam 221, as a first measurement beam, to the target object 30 to a first focal depth, emit the measurement beam 222, as a second measurement beam, to the target object 30 to a second focal depth, and emit third measurement beam 221, as a third measurement beam, to the target object 30 to a third focal depth.

The optical coupler 12 may receive response beams from the probe 20. The response beams may have different central wavelengths. The probe 20 may transmit the response beams to the optical coupler 12 through a path by which measurement beams are received. Accordingly, the response beams may be transmitted to the optical coupler 12 through free space in response to previously received measurement beams or through a transmission medium, such as optical fibers.

The optical coupler 12 may sequentially receive response beams from the probe 20. For example, the optical coupler 12 may receive a first response beam of the response beams from the probe 20 and receive a second response beam of the response beams from the probe 20. The optical coupler 12 may simultaneously receive the response beams from the probe 20. For example, the optical coupler 12 may simultaneously receive the response beams from the probe 20 through optical fibers of the optical coupler 12 by wavelength division multiplexing. The response beams may be combined into one beam based on central wavelengths of the response beams by wavelength division multiplexing and received through optical fibers, and the received response beams may be split from one another by terminals of the optical fibers by wavelength division demultiplexing. For example, the received response beams may be split from one another by the optical coupler 12. In addition, the optical coupler 12 may simultaneously receive the response beams from the probe 20 through free space.

The detector 13 may detect a first interference signal based on interference between any one of response beams and a corresponding one of reference beams. For example, interference may refer to a phenomenon in which, if at least two waves (e.g., beams) overlap one another, an observed/resultant intensity of an interference signal generated based on the overlap may be greater or less than a sum of individual intensities of the overlapped beams. Interference between two beams having the same frequency may be expressed as shown in Equation 2. It is assumed that the two beams are split from a beam having a central wavelength and combined into one beam at one point through different paths. Furthermore, $I_{12}$ refers to an intensity relative to interference between two beams, $I_1$ refers to an intensity of any one of the two beams, $I_2$ refers to an intensity of the other one of the two beams, and $\delta$ refers to a synthesis phase difference caused by a path difference and a phase difference between the two beams. Referring to Equation 2, an intensity caused by interference between two beams has a value different from a sum of intensities of the two beams. The different value may be generally an intensity of an interference signal. Referring to Equation 2, the interference signal may be a constructive interference signal having a positive value or a destructive interference signal having a negative value according to the synthesis phase difference $\delta$.

$$I_{12}=I_1+I_2+2\sqrt{I_1 I_2}\cos\delta \qquad (2).$$

For example, interference between two beams may occur if a phase difference between the two beams is maintained constant for a time or within a spatial distance. The time in which the phase difference between the two beams is constant may be referred to as a coherence time, and the spatial distance in which the phase difference therebetween is constant may be referred to as a coherence distance. There may be finite coherence distances between most beams. By reflecting a coherence distance and a coherence time of beams in Equation 2, Equation 3 may be obtained. It is assumed that two beams are split from a beam having a central wavelength and combined into one beam at one point through different paths. Also, $\tau$ refers to a time difference between the two beams and may be changed into $$\frac{\Delta L}{c}.$$

Furthermore, c refers to a velocity of the two beams. In addition, $\tau_0$ refers to a coherence time of the two beams, $\omega_0$ refers to central frequencies of the two beams, $\Delta L$ refers to a difference in optical paths between the two beams, $L_c$ refers to a coherence distance between the two beams, $k_0$ refers to $$\frac{2\pi}{\lambda},$$

and $\lambda$ refers to central wavelengths of the two beams. Referring to Equation 3, because it is assumed that there is no irregular phase variation, if $\tau$ is $\tau_0$, an interference term may be eliminated so that $I_{12}$ can be the sum of $I_1$ and $I_2$. Accordingly, to obtain an interference signal, the difference $\Delta L$ in optical paths between the two beams may be less than the coherence difference $L_c$ between the two beams. For example, the coherence difference $L_c$ between the two beams may be determined as shown in the above-described Equation 1:

$$I_{12} = I_1 + I_2 + 2\sqrt{I_1 I_2}\left(1 - \frac{\tau}{\tau_0}\right)\cos(\omega_0 \tau) \qquad (3)$$
$$= I_1 + I_2 + 2\sqrt{I_1 I_2}\left(1 - \frac{\Delta L}{L_c}\right)\cos(k_0 \Delta L).$$

Thus, in response to the combining of two beams, which were split from a beam having a central wavelength, into one beam at one point through different paths wherein the difference in optical paths between the two beams is less than a coherence distance between the two beams, an interference signal may occur. The detector 13 may detect a first interference signal based on interference between a first reference beam and a first response beam. For example, the first reference beam split from a first beam may travel through an optical path of the first reference beam and reach the optical coupler 12. In contrast, a first measurement beam split from the first beam and emitted to the target object 30 may be converted into the first response beam and reach the optical coupler 12 through optical paths of the first measurement and response beams. If the optical path of the first reference beam has the same length as that of the first response beam, then the first interference signal may be generated based on interference between the first reference beam and the first response beam. The first interference signal may be detected using the detector 13. The first interference signal may be detected if a difference in optical paths between the first response and reference beams is a critical value or less. As an example, the critical value may be determined based on a coherence distance corresponding to any one of the first beam, the first reference beam, the first measurement beam, and the first response beam. For example, if the coherence distance is approximately 30 μm, the critical value may be approximately 30 μm.

If the first measurement beam split from the first beam by the optical coupler 12 is emitted to the target object 30 through the probe 20, reflected or scattered by the target object 30, received as the first response beam by the probe 20, and then received by the optical coupler 12, the optical path of the first response beam may refer to a path leading from a point at which the first measurement beam is split from the first beam to a point at which the first response beam is received by the optical coupler 12. Also, if the first reference beam split from the first beam by the optical coupler 12 is emitted to a reference reflector, reflected by the reference reflector, and received by the optical coupler 12, the optical path of the first reference beam may refer to a path leading from a point at which the first reference beam is split from the first beam to a point at which the first reference beam is received by the optical coupler 12.

The detector 13 may detect the first interference signal. For example, the detector 13 may detect the first interference signal using a light receiving unit. A representative example of the light receiving unit may include a photo-detector.

The detector 13 may detect a second interference signal based on interference between another one of the response beams and a corresponding one of the reference beams. For example, the second interference signal may refer to a signal generated based on interference between a second response beam transmitted to the probe 20 in response to a second measurement beam emitted to the target object 30 and a second reference beam. If an optical path of the second response beam has the same length as that of the second reference beam, then the second interference signal may be generated based on interference between the second response beam and the second reference beam. Also, the second interference signal may be detected using the detector 13.

The image processor 14 may generate a first image of the target object 30 using the first interference signal. For example, the image processor 14 may record an axial variation of any one measurement point of the target object 30 using the first interference signal, accumulate the recording of the axial variation of the measurement point while moving the measurement point in a lateral direction, and generate the first image. For example, the axial variation may be a variation in an intensity of the first interference signal corresponding to a variation in the optical path of the first reference beam.

Figure 4:
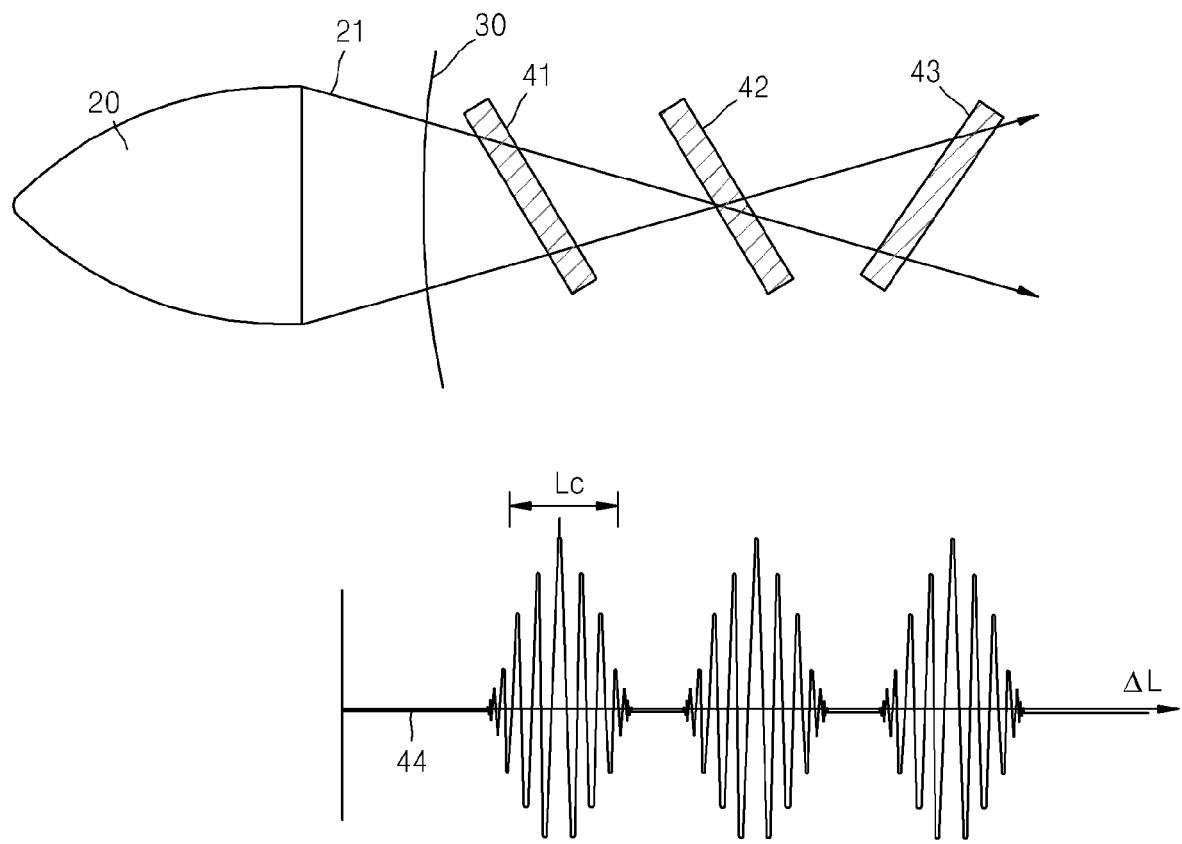
FIG. 4 is a diagram illustrating an example of a measurement beam transmitted to a target object and an interference signal.

FIG. 4 is a diagram illustrating an example of a measurement beam 21 emitted to the target object 30 and an interference signal 44.

Referring to FIG. 4, the interference signal 44 may have an intensity that varies in response to an internal axial variation of the target object 30. For example, the probe 20 may receive a first response beam in response to a first measurement beam 21 emitted to the target object 30. For example, the first response beam may include reflection beam components that have been reflected or scattered off the target object 30. Also, the reflection beam components may be reflected to different extents according to internal points of the target object 30. For example, amplitudes of reflection beam components reflected or scattered off points 41, 42, and 43 within the target object 30 may be greater than amplitudes of reflection beam components reflected or scattered off other points. Accordingly, if the reflection beam components reflected or scattered off the points 41, 42, and 43 correspond to an optical path of a first reference beam, interference may occur therebetween, and a signal intensity caused by the interference may be much higher than a signal intensity caused by interference between reflection beam components reflected or scattered off other points and the first reference beam. Furthermore, an envelope width of a signal caused by the interference between the reflection beam components reflected or scattered off the points 41, 42, and 43 and the first reference beam may correspond to a coherence distance corresponding to the first measurement beam 21, the first response beam, and the first reference beam, and variations of the interference along an X-axis of the first interference signal 44 may depend on a difference in optical paths between the first response and reference beams.

An image processor may record a variation in a signal intensity of the first interference signal 44 based on interference between the first response and reference beams based on the difference in optical paths between the first response and reference beams and thus may measure variation in the axial direction of the target object 30 in a depthwise direction. Furthermore, as described above, the image processor may accumulate the measurement of the depthwise axial variation in a lateral direction and generate a first image.

The image processor may generate a second image of the target object 30 using the second interference signal. For example, the image processor may record an axial variation of any one measurement point of the target object 30 using the second interference signal, accumulate the recording of the axial variation of the measurement point while moving the measurement point in a lateral direction, and generate the second image. As an example, the axial variation may be a variation in an intensity of the second interference signal in response to a variation in the optical path of the second reference beam.

Figure 5:
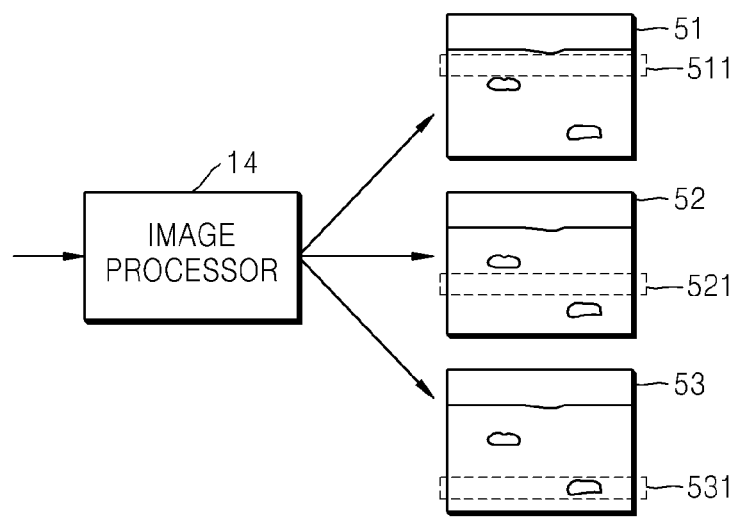
FIG. 5 is a diagram illustrating an example of an image processor and images output by the image processor.

FIG. 5 is a diagram illustrating an example of an image processor 14 and images 51, 52, and 53 output by the image processor 14.

Referring to FIG. 5, the image processor 14 may generate the image 51 as a first image using a first interference signal generated based on interference between a first response beam of response beams and a first reference beam of reference beams, generate the image 52 as a second image using a second interference signal generated based on interference between a second response beam of the response beams and a second reference beam of the reference beams, and generate the image 53 as a third image using a third interference signal generated based on interference between a third response beam of the response beams and a third reference beam of the reference beams. The first, second, and third reference beams may have different central wavelengths, and the first through third response beams may have different central wavelengths. For example, the first reference beam and the first response beam may have a central wavelength of approximately 500 nm, the second reference beam and the second response beam may have a central wavelength of approximately 800 nm, and the third reference beam and the third response beam may have a central wavelength of approximately 1300 nm.

It is assumed that the first image 51, the second image 52, and the third image 53 are images of the target object 30 obtained using the same measurement conditions. In other words, the probe 20 may emit a first measurement beam for the first image 51, a second measurement beam for the second image 52, and a third measurement beam for the third image 53 to the same focal depth within the same measurement range, and the image processor 14 may generate the first, second, and third images 51, 52, and 53 based on the above-described measurement conditions. However, the light source 11 may generate a first beam for the first image 51, a second beam for the second image 52, and a third beam for the third image 53 to have different central wavelengths. For instance, the first beam may have a central wavelength of approximately 500 nm, the second beam may have a central wavelength of approximately 800 nm, and the third beam may have a central wavelength of approximately 1300 nm.

In this case, even if the first through third images 51, 52, and 53 are obtained using the same measurement conditions, there may be differences between the first through third images 51, 52, and 53. For example, a region 511 of the first image 51 may be a clear region (e.g., a high-frequency image region) as compared to other regions of the first image 51, a region 521 of the second image 52 may be a clear region (e.g., a high-frequency image region) as compared to other regions of the second image 52, a region 531 of the third image 53 may not be a clear region (e.g., a high-frequency image region) as compared to other regions of the third image 53. As a result, there may be differences between the first through third images 51, 52, and 53. The differences between the first through third images 51, 52, and 53 may result from differences among the central wavelength of the first beam for the first image 51, the central wavelength of the second beam for the second image 52, and the central wavelength of the third beam for the third image 53. For example, the differences between the central wavelengths of the first through third beams may lead to differences in axial resolutions and lateral resolutions between the first through third images 51, 52, and 53 and differences in transmittance between the first through third beams, and the differences in the axial and lateral resolutions and transmittance may lead to the differences between the first through third images 51, 52, and 53. In general, an axial resolution of an image may be determined by a central wavelength of a beam for the image as shown in Equation 1, and transmittance of a beam may also depend on the central wavelength thereof.

For example, a lateral resolution of an image may be determined based on a central wavelength of a beam for the image. For example, as shown in Equation 4, a lateral resolution of an image generated by the optical coherence tomography apparatus 10 may be determined based on a central wavelength of a measurement beam and a numerical aperture (NA) of a lens of the probe 20. Referring to Equation 4, $\Delta x$ refers to the lateral resolution of the image generated by the optical coherence tomography apparatus 10 if the measurement beam is used, $\lambda$ refers to the central wavelength of the measurement beam, and NA refers to the NA of the lens of the probe 20. The NA of the lens may indicate a condensing capability of the lens, that is, a maximum range of angles at which a beam may be incident. Also, as described above, a central wavelength of a beam from which the measurement beams splits off from may be the same as the central wavelength $\lambda$ of the measurement beam. Referring to FIG. 3, if the central wavelength of the first measurement beam 211 is greater than those of the second measurement beam 212 and the third measurement beam 213, a lateral resolution 311 of the first measurement beam 211 at a focal depth may become lower than a lateral resolution 312 of the second measurement beam 212 at the same focal depth and a lateral resolution 313 of the third measurement beam 213 at the same focal depth based on an axial measurement range 31 in the target object 30. The first through third measurement beams 211, 212, and 213 are emitted to the same focal depth. However, in another aspect, the first through third measurement beams 211, 212, and 213 may be emitted to different focal depths.

$$\Delta x \approx \frac{\lambda}{NA}. \tag{4}$$

The image processor 14 may generate an image using a first interference signal and a second interference signal. For example, the image processor 14 may detect interference signals based on interference between response beams simultaneously or sequentially arrived on the optical coupler 12 and reference beams simultaneously or sequentially arrived on the optical coupler 12 and generate images using the detected interference signals.

Figure 6:
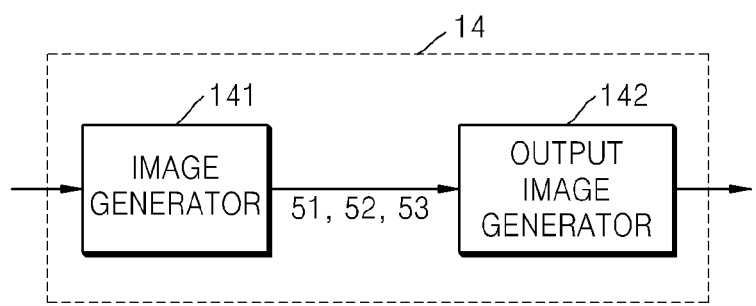
FIG. 6 is a diagram illustrating an example of an image processor.

FIG. 6 is a diagram illustrating an example of the image processor 14.

Referring to FIG. 6, the image processor 14 may include an image generator 141 and an output image generator 142. However, the image processor 14 of FIG. 6 is only an example. For example, components of the image processor 14 shown in FIG. 6 may be variously modified.

The image generator 141 may generate a first image using a first interference signal and generate a second image using a second interference signal. In another aspect, the image generator 141 may further generate a third image using a third interference signal. Because other functions of the image generator 141 may be easily understood with reference to the description of the image processor 14, a description thereof will be omitted.

The output image generator 142 may generate an output image from a first image and a second image. For example, the output image generator 142 may synthesize the first image 51 and the second image 52 and generate an output image. In another aspect, the output image generator 142 may apply a first weight to the first image 51, apply a second weight to the second image 52, and synthesize the first and second images 51 and 52 to generate the output image according to the first and second weights. In another aspect, the output image generator 142 may further synthesize the third image 53 and a fourth image in addition to the first and second images 51 and 52 and generate an output image.

The output image generator 142 may extract the high-frequency region 511 from the first image 51 based on a central wavelength of at least one of measurement beams or at least one of response beams. For example, the output image generator 142 may receive the central wavelength of any one of the measurement beams or the central wavelength of any one of the response beams from the image generator 141, determine a high-frequency region using the first image 51 according to the received central wavelength, and extract the high-frequency region 511 from the first image 51 based on the determination result. The output image generator 142 may extract the high-frequency region 511 from the first image 51 using various parameters. Examples of the parameters may include the above-described central wavelength, an axial resolution, a lateral resolution, transmittance, a focal depth, and the like.

The output image generator 142 may extract the high-frequency region 521 from the second image 52 based on a central wavelength of another one of the measurement beams or a central wavelength of another one of the response beams. As an example, the output image generator 142 may further extract the high-frequency region 531 of the third image 53 based on a central wavelength of yet another one of the measurement beams or a central wavelength of yet another one of the response beams.

The output image generator 142 may generate an output image using the first and second images 51 and 52 based on the extracted high-frequency region 511 of the first image 51 and the extracted high-frequency region 521 of the second image 52. For example, the output image generator 142 may synthesize the high-frequency region 511 of the first image 51 and the high-frequency region 521 of the second image 52 and generate an output image. In another aspect, the output image generator 142 may apply a first weight to the high-frequency region 511 of the first image 51, apply a second weight to the high-frequency region 521 of the second image 52, and synthesize the high-frequency region 511 of the first image 51 and the high-frequency region 521 of the second image 52 to generate an output image according to the first weight and second weight. However, the output image generator 142 may synthesize the high-frequency region 511 of the first image 51, the high-frequency region 521 of the second image 52, and the high-frequency region 531 of the third image 53 and generate an output image.

The output image generator 142 may apply a first weight to the high-frequency region 511 of the first image 51, apply a second weight to the high-frequency region 521 of the second image 52, and synthesize the first and second images 51 and 52 to generate an output image according to the first and second weights. As an example, output image generator 142 may apply a first weight to the high-frequency region 511 of the first image 51, apply a second weight to the high-frequency region 521 of the second image 52, apply a third weight to the high-frequency region 531 of the third image 53, and synthesize the first through third images 51, 52, and 53 to generate an output image according to the first weight, the second weight and the third weight.

Figure 7:
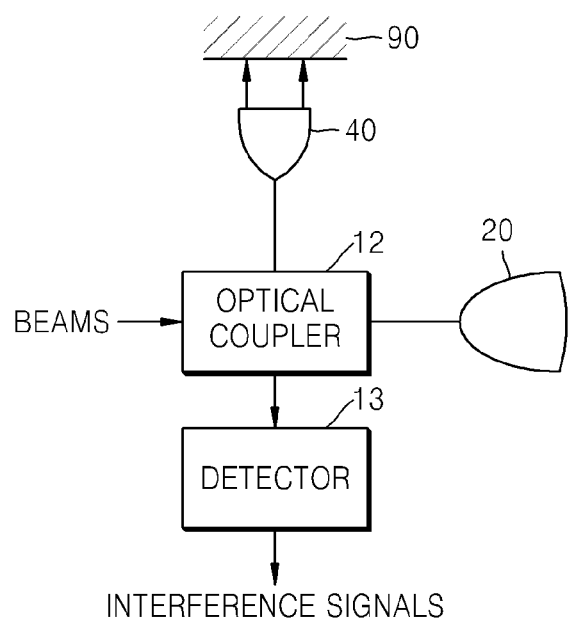
FIG. 7 is a diagram illustrating an example of an apparatus for optical coherence tomography.

FIG. 7 is a diagram illustrating an example of an optical coherence tomography apparatus 10.

Referring to FIG. 7, an optical coupler 12 may transmit reference beams to a reflector 90 via a reference probe 40 and receive reflection beams from the reference probe 40. Also, the detector 13 may detect a first interference signal based on interference between any one of response beams and a corresponding one of reflection beams and detect a second interference signal based on interference between another one of the response beams and a corresponding one of the reflection beams. For example, the reflection beams may have a much smaller loss of intensity than the reference beams. However, the reflection beams may be synonymous with the reference beams.

As an example, the reference probe 40 may control optical paths of the reference beams. The reference probe 40 may control the optical paths of the reference beams using an optical path control unit. Representative examples of the optical path control unit may include a unit configured to control a distance to a reference reflector, a unit configured to control an optical path using a rotatable cube, a unit configured to control an optical path using tension of optical fibers, and a unit configured to control an optical path using a diffraction grating. As described above, changing the optical paths of the reference beams may result in an interference signal indicating a variation in signal intensity in response to an axial variation of a target object.

FIG. 8 is a flowchart illustrating an example of a method for optical coherence tomography. The method illustrated in FIG. 8 may include operations performed by the optical coherence tomography apparatus 10 of FIG. 1 in time series. Accordingly, even though omitted hereinbelow, descriptions that are already given above in connection with the optical coherence tomography apparatus 10 may be applied to the method shown in FIG. 8, that is, a method of measuring organism signals.

In operation 81, a light source 11 generates a plurality of beams. In operation 82, an optical coupler 12 splits beams into measurement beams and reference beams. In operation 83, the optical coupler 12 transmits the measurement beams to the target object 30 via the probe 20. In operation 84, the optical coupler 12 receives response beams in response to the transmission of the measurement beams by the optical coupler 12. In operation 85, the detector 13 detects interference signals based on interference between the response beams and the reference beams. In operation 86, the image processor 14 generates a first image based on any one of the interference signals and a second image having image characteristics different from those of the first image based on another one of the interference signals.

As described above, according to the one or more of the above examples, a plurality of images may be generated using a plurality of beams, thereby generating more various organism image signals. Also, a plurality of organism image signals may be generated using a plurality of beams having different central wavelengths and then the image signals may be synthesized, thereby providing higher-resolution organism images. Furthermore, the images generated using beams having a plurality of central wavelengths may ensure a high resolution with respect to depth of living tissues.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

For example, the method for optical coherence tomography illustrated in FIG. 8 can be written as computer programs and can be implemented in general-use digital computers that may execute the programs using a computer-readable recording medium.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for optical coherence tomography, the apparatus comprising:
a light source configured to generate beams having different central wavelengths;
a light coupler configured to
split the beams into measurement beams and reference beams;
transmit the measurement beams to a target object via a probe; and
receive response beams from the probe;
a detector configured to detect interference signals based on interference between the response beams and the reference beams; and
an image processor configured to:
generate a first image of the target object based on any one of the interference signals;
generate a second image of the target object having at least one of an axial resolution, a lateral resolution, and transmittance different from those of the first image based on another one of the interference signals; and
generate an output image by synthesizing a high-frequency region of the first image and a high-frequency region of the second image,
wherein the high-frequency region of the first image is different from the high-frequency region of the second image.

2. The apparatus of claim 1, wherein:
one of the response beams and one of the reference beams are beams having a first central wavelength; and
another one of the response beams and another one of the reference beams are beams having a second central wavelength.

3. The apparatus of claim 1, wherein:
the interference signal associated with the first image is detected based on interference between any one of the response beams and a corresponding one of the reference beams; and
the interference signal associated with the second image is detected based on interference between another one of the response beams and a corresponding one of the reference beams.

4. The apparatus of claim 1, wherein:
the probe sequentially transmits the measurement beams to the target object; and
the probe sequentially receives the response beams from the target object.

5. The apparatus of claim 1, wherein:
the probe simultaneously transmits the measurement beams to the target object; and
the probe simultaneously receives the response beams from the target object.

6. The apparatus of claim 5, wherein:
a first selected response beam is extracted from the response beams; and
a second selected response beam is extracted from the response beams.

7. The apparatus of claim 1, wherein the measurement beams are transmitted to the target object to a single focal depth.

8. The apparatus of claim 1, wherein:
a first measurement beam, which is selected from the measurement beams, is transmitted to the target object to a first focal depth; and
a second measurement beam, which is selected from the measurement beams, is transmitted to the target object to a second focal depth.

9. The apparatus of claim 1, wherein the image processor is configured to:
generate the output image b synthesizing the first and second images based on a first weight of the first image and a second weight of the second image.

10. The apparatus of claim 1, wherein the image processor is configured to:
extract the high-frequency region of the first image from the first image based on a central wavelength of a measurement beam corresponding to the first image from among the measurement beams;
extract the high-frequency region of the second image from the second image based on a central wavelength of a measurement beam corresponding to the second image from among the measurement beams; and
generate the output image from the first and second images based on the extracted high-frequency region of the first image and the extracted high-frequency region of the second image.

11. The apparatus of claim 1, wherein:
the lights coupler transmits the reference beams to a reflector via a reference probe and receives reflection beams from the reference; and the detector detects inference signals based on interference between the response beams and the reflection beams.

12. A method for optical coherence tomography, the method comprising:
    generating beams having different central wavelengths;
    splitting the beams into measurement beams and reference beams;
    transmitting the measurement beams to a target object via a probe;
    receiving response beams transmitted to the probe from the probe in response to the measurement beams;
    detecting interference signals based on interference between the response beams and the reference beams;
    generating a first image of the target object based on any one of the interference signals;
    generating a second image of the target object having at least one of an axial resolution, a lateral resolution, and transmittance different from those of the first image based on another one of the interference signals; and
    generating an output image by synthesizing a high-frequency region of the first image and a high-frequency region of the second image,
    wherein the high-frequency region of the first image is different from the high-frequency region of the second image.

13. The method of claim 12, wherein:
    one of the response beams and one of the reference beams are beams having a first central wavelength; and
    another one of the response beams and another one of the reference beams are beams having a second central wavelength.

14. The method of claim 12, wherein:
    the interference signal associated with the first image is detected based on interference between any one of the response beams and a corresponding one of the reference beams; and
    the interference signal associated with the second image is detected based on interference between another one of the response beams and a corresponding one of the reference beams.

15. The method of claim 12, wherein:
    the measurement beams are sequentially transmitted to the target object by the probe; and
    the response beams are sequentially received from the target object by the probe.

16. The method of claim 12, wherein:
    the measurement beams are simultaneously transmitted to the target object by the probe; and
    the response beams are simultaneously received from the target object by the probe.

17. The method of claim 16, wherein:
    any one of the response beams is extracted from the response beams; and
    another one of the response beams is extracted from the response beams.

18. The method of claim 12, wherein the measurement beams are transmitted to the target object to a single focal depth.

19. The method of claim 12, wherein:
    any one of the measurement beams is transmitted to the target object to a first focal depth; and
    another one of the measurement beams is transmitted to the target object to a second focal depth.

20. The method of claim 12, wherein the generating of the output image comprises generating the output image by synthesizing the high-frequency region of the first and the high-frequency region of second images based on a first weight of the first image and a second weight of the second image.

21. The method of claim 12, further comprising:
    transmitting the reference beams to a reflector via a reference probe; and
    receiving reflection beams from the reference probe,
    wherein the detecting of the interference signals comprises detecting the interference signals based on interference between the response beams and the reflection beams.

22. A non-transitory computer-readable medium having embodied thereon a computer program that upon the computer program being executed causes a processor to execute a method for optical coherence tomography, the method comprising:
    generating beams having different central wavelengths;
    splitting the beams into measurement beams and reference beams;
    transmitting the measurement beams to a target object via a probe;
    receiving interference signals detected based on interference between response beams received from the target object by the probe and the reference beams;
    generating a first image based on any one of the interference signals;
    generating a second image having at least one of an axial resolution, a lateral resolution, and transmittance different from those of the first image based on another one of the interference signals; and
    generating an output image by synthesizing a high-frequency region of the first image and a high-frequency region of the second image,
    wherein the high-frequency region of the first image is different from the high-frequency region of the second image.

* * * * *